Patented Apr. 29, 1952

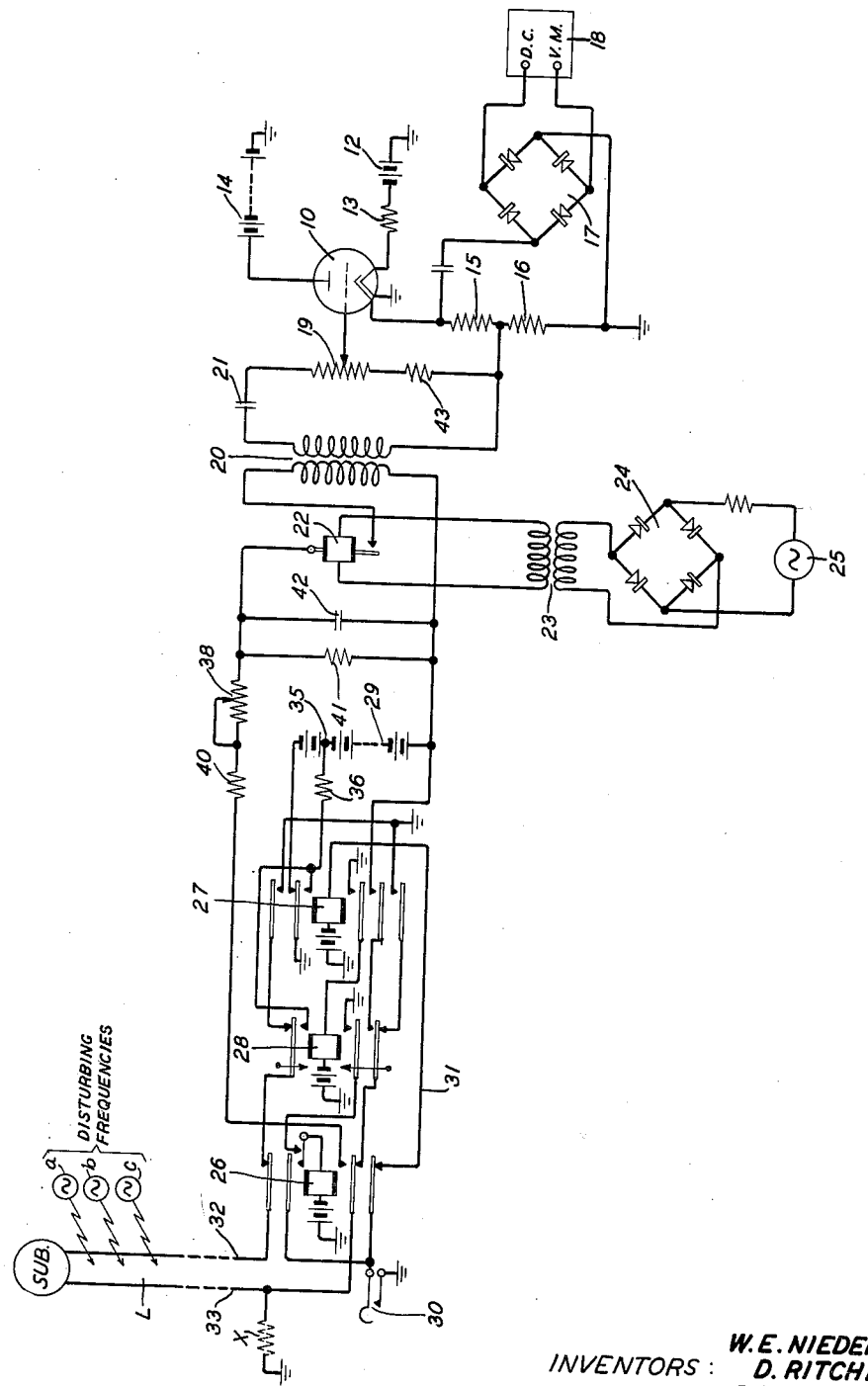

2,595,163

UNITED STATES PATENT OFFICE 2,595,163

ELECTRONIC VOLTMETER TEST CIRCUIT FOR MEASURING HIGH-RESISTANCE LEAKS

William Edward Niederau, Arlington, David Ritchie, Jr., North Plainfield, and Paul L. Wright, Newark, N. J., assignors to Bell Telephone Laboratories, Incorporated, New York, N. Y., a corporation of New York Application August 16, 1950, Serial No. 179,844

5 Claims. (Cl. 179—175)

1

This invention relates to testing systems and more particularly to an electronic voltmeter circuit for detecting and measuring high resistance leaks on telephone subscribers' lines.

The routine testing of telephone lines is frequently undertaken in wet weather when incipient trouble conditions are readily detected. In order that such detected and reported conditions may be more accurately evaluated and corrective measures, if indicated, taken, the lines so reported are subject to further tests which may be undertaken under dry weather conditions. Unless the testing facilities employed are sufficiently sensitive to detect, in dry weather, trouble conditions which tend to be emphasized or exaggerated in wet weather it is possible for some incipient trouble conditions to go unnoticed and, possibly, to develop into more serious faults before detection.

The object of this invention is to provide a simple, highly sensitive, dependable and otherwise improved system for detecting and measuring high resistance leaks on telephone lines.

In accordance with a particular feature of this invention a highly sensitive electronic control circuit is employed in combination with the regular test desk direct-current voltmeter at a telephone exchange as a means for detecting and measuring high resistance leaks on telephone lines.

Another feature of the invention resides in a line conditioning relay arrangement which, incident to the seizure of a telephone line for test purposes and the subsequent operation of a test key, functions to discharge the line, recharge it to a predetermined potential and thereafter to automatically connect the line to the test circuit.

Still another feature of the invention contemplates the use of means for rendering the test circuit substantially immune to the effects of stray alternating-current interference thereby insuring a more accurate determination of the leakage condition of the line under test. More particularly, the invention utilizes a by-passing condenser in combination with a "chopper," or mechanical modulator which is driven at a frequency within the range of the stray disturbing frequencies to produce a pulsating potential across the input terminals of the test circuit, which is substantially free of any of the disturbing frequencies.

These and other features of the invention will be readily understood from the following detailed description when read with reference to the accompanying drawings, the single figure of which is a functional schematic of the electronic voltmeter test circuit of this invention and its associated "chopper" and line conditioning relay circuits. The drawing shows also a telephone subscriber's line and associated substation and a plurality of sources of disturbing frequencies, the latter being shown schematically as inductively influencing the line.

The electronic voltmeter test circuit includes a cathode-follower tube 10 comprising the usual plate, grid and cathode elements, the last involving a filament which is heated by current from the battery 12 through a resistance 13 in well-known manner. A high voltage battery 14 is included in the plate circuit of the tube 10, the cathode of which is connected to ground potential by way of the resistance elements 15 and 16. The potential drop across the resistances 15 and 16 is impressed on the input terminals of a full wave rectifier 17, which may be of the dry disc type, the output terminals of which are connected to the direct-current voltmeter 18.

The grid electrode of tube 10 is connected to a potentiometer 19 which is connected across the secondary winding of input transformer 20 by way of condenser 21.

The "chopper" circuit comprises a mechanical modulator, or relay 22 whose coil is connected across the secondary winding of transformer 23. The primary winding of transformer 23 is connected across the output terminals of a full wave rectifier 24, which may be of the dry rectifier type, the input terminals of which are connected to the terminals of a source 25 of 20-cycle alternating current. The frequency of the source 25 is specified as being 20 cycles for the reason that, in the present case, it is assumed that the disturbing frequencies schematically shown on the drawing at $a$, $b$ and $c$ are of the order of 20, 40 and 60 cycles and to most effectively eliminate such frequencies it has been found that the chopper relay, or modulator 22 should be driven at the rate of 40 cycles per second. The 40-cycle chopper drive is obtained by impressing current from the 20-cycle source on the primary winding of transformer 23 by way of the full wave rectifier 24. The transformer secondary and, therefore, the winding of relay 22 are thus subjected to and traversed by a 40-cycle alternating current. This chopper arrangement has been found to be very stable.

The line conditioning circuit comprises three relays 26, 27 and 28, the last being a slow-to-operate relay. This circuit operates in the following manner. When the electronic voltmeter key 30 is operated relay 27 operates in a circuit which includes the outer lower armature and back contact of relay 26 and conductor 31. At its outer upper and lower armatures and front contacts, relay 27 connects ground potential to the tip and ring conductors 32 and 33 of the line L under test. The tip circuit to ground includes the outer upper armature and back contact of relay 26 and the upper armature and back contact of relay 28, and the ring circuit to ground includes the inner lower armature and back contact of relay 26 and the outer lower armature of relay 28. The connection of ground to the conductors of line L causes any charge which may have accumulated on the line conductors to be dissipated and the line to be effectively discharged.

Relay 27, at its innermost lower armature and front contact completes an obvious operating circuit for relay 28. Relay 28 is slow to operate to insure adequate time for the discharge of the line and for the locking circuit for relay 26 to become available. When relay 28 operates it disconnects the discharging ground from the line L and connects part of the test battery 29 thereto to charge the line to a predetermined potential. The line L charges to the potential of the test battery, the charging circuit, which persists until relay 26 operates, being traced from the lower terminal of battery 29, front contact and middle lower armature of relay 27, front contact and outer lower armature of relay 28, back contact and inner lower armature of relay 26, ring conductor 33 of the line L to ground through the assumed resistance leak X; the other terminal 35 of the battery 29 is conneceed to ground by way of resistance 36 and the front contact and inner upper armature of relay 27, which relay contact is also connected to the tip conductor 32 of line L until relay 26 operates.

When relay 28 operated an energizing circuit for relay 26 was completed which includes the front contact and inner lower armature of relay 26. When relay 26 operates, which it does immediately after relay 28 operates, it locks up under control of key 30; opens the energizing circuit of relay 27; connects the ring conductor 33 of line L through to the armature of modulator relay 22 by way of the high resistance potentiometer 38 and resistance 40; and opens the tip conductor 32 of line L. Relay 27 restores its armatures and causes relay 28 to be deenergized whereupon relay 28 restores to normal. Relay 26, however, remains operated until the key 30 is restored.

The resistances 40 and 38 constitute a high impedance circuit which is connected to the ring conductor 33 and, therefore, to the leakage resistance X incident to the operation of relay 26 and the release of relay 27. It will be observed that resistance 41, which is relatively low in magnitude is included in series with high resistances 38 and 40 and test battery 29 and that the circuit including these elements is connected to the leakage resistance X. It is to be noted further that condenser 42 is connected in parallel with the resistance 41 and is actually in shunt with the primary winding of coupling transformer 20 when the contacts of modulator relay 22 are closed. Thus the condenser 42 bypasses alternating current from the line L under test and permits only a very small amount of the interference currents to reach the input circuit of the tube 10. The chopped relay 22, as hereinbefore stated, is driven at a rate of 40 cycles per second and this frequency is in such relation to the interference frequencies a, b and c as to further reduce the interference currents induced in the secondary winding of transformer 20. The interference currents, now severely attenuated, are substantially eliminated by the tube circuit, the rectifier 17 and the inherent dampening characteristic of the meter 18.

The potential applied to the tube circuit is representative of the value of resistance X and is derived from resistance 41 the resistance of which is but a small part of the high impedance of the circuit in which it is included and which includes the resistor 40 and the potentiometer 38. This potential is applied to the grid of tube 10 by way of the contacts of relay 22, transformer 20, condenser 21, potentiometer 19 and resistance 43. The plate circuit of tube 10 includes resistance elements 15 and 16 across which the voltmeter 18 is connected by way of the full wave rectifier 17. The deflection of the voltmeter needle is therefore a true reflection of the value of resistance X and by suitable calibration the voltmeter may be made to read directly the value of this resistance.

Each time the key 30 is operated the above-described cycle of operations is repeated. It is to be understood that suitable switching facilities are provided, in practice, to interchange the tip and ring connections to the test circuit so that the insulation resistance test may be applied to the tip conductor as well as to the ring conductor. Also, no means for seizing the subscribers' lines are illustrated since this may be accomplished in any well-known manner and the method of seizure constitutes no part of the present invention.

What is claimed is:

1. The combination of a line circuit one conductor of which includes a leakage path to ground, a plurality of sources of current of different known frequencies so located with respect to said line as to inductively influence it, and a line insulation test circuit comprising a vacuum tube having an output circuit and an input circuit, a meter in the output circuit of said vacuum tube, a test battery, a high impedance circuit including a resistance element of relatively low impedance, a condenser connected in parallel with the said low impedance resistance element, manually operable means for completing a series circuit including said test battery, said high impedance circuit and the said one conductor of said line circuit and its leakage path, switching means for connecting the said low impedance element across the input circuit of said tube, and means for driving said switching means at a predetermined frequency.

2. The combination of a line circuit one conductor of which includes a current leakage path to ground and which is normally subject to the influence of stray currents of known frequencies and a line insulation test circuit comprising a vacuum tube having an output circuit and an input circuit including the secondary winding of a coupling transformer, a meter in the output circuit of said tube, a test battery, a relay and contacts controlled thereby, a high impedance circuit including a resistance of relatively low impedance, a condenser shunting said low impedance resistance, means for completing a series circuit including said test battery, said high impedance circuit and the said one conductor of said line circuit and its leakage path, and means including said relay and the contacts controlled thereby for repeatedly connecting said condenser across the input winding of said transformer at a predetermined frequency.

3. The combination of a two-conductor line circuit a first conductor of which includes a leakage to ground, an insulation test circuit comprising a vacuum tube having input and output circuits, a meter included in the output circuit of said tube, a coupling transformer having its secondary winding included in the input circuit of said tube, a test battery, a key, a relay having switching contacts, a high impedance circuit including a relatively low impedance resistance element, switch means responsive to an operation of said key for connecting ground potential to both conductors of said line, for thereafter opening the second conductor of said line and completing a series circuit including the said first conductor of said line and its leakage path, said high impedance circuit and said test battery, means including the switching contacts of said relay for connecting the low resistance element of said high impedance circuit across the primary winding of said coupling transformer, and means for driving said relay at a predetermined frequency.

4. The combination defined in claim 3 and in which the means responsive to an operation of said key comprises a plurality of sequentially operating electromagnetic relays.

5. In a system for testing the insulation resistance of telephone line circuits which are normally subjected to the influence of stray currents of known frequencies, a telephone line circuit one conductor of which includes a leakage path to ground, a test circuit including a test battery, high impedance elements and a low resistance element, means for completing a series circuit which includes said test battery, said high impedance elements, said low resistance element and the said one conductor of said telephone line whereby the potential across said low resistance element is a measure of the insulation resistance of the said conductor of said telephone line, an electronic detecting device having input and output circuits, an alternating-current bypassing condenser connected in shunt with the said low resistance element, intermittently operating means for impressing the potential across said low resistance element on the input circuit of said electronic detecting device, a meter in the output circuit of said electronic detecting device, and means for driving said intermittently operating means at a predetermined frequency.

WILLIAM EDWARD NIEDERAU.
DAVID RITCHIE, Jr.
PAUL L. WRIGHT.

REFERENCES CITED

The following references are of record in the file of this patent:

UNITED STATES PATENTS

| Number | Name | Date |
| --- | --- | --- |
| 2,297,543 | Eberhardt et al. | Sept. 29, 1946 |
| 2,414,612 | Ross | Jan. 21, 1947 |
| 2,497,129 | Liston | May 2, 1947 |